US008578457B2

(12) United States Patent
Kan

(10) Patent No.: US 8,578,457 B2
(45) Date of Patent: Nov. 5, 2013

(54) PROCESS OF REMOTE USER AUTHENTICATION IN COMPUTER NETWORKS TO PERFORM THE CELLPHONE-ASSISTED SECURE TRANSACTIONS

(76) Inventor: Dmitry I. Kan, Almaty (KZ)

( * ) Notice: Subject to any disclaimer, the term of this patent is extended or adjusted under 35 U.S.C. 154(b) by 826 days.

(21) Appl. No.: 12/629,105

(22) Filed: Dec. 2, 2009

(65) Prior Publication Data

US 2011/0131638 A1  Jun. 2, 2011

(51) Int. Cl.
*G06F 21/00* (2013.01)
(52) U.S. Cl.
USPC .......................................................... 726/5
(58) Field of Classification Search
USPC ....................................................... 726/5, 6
See application file for complete search history.

(56) References Cited

U.S. PATENT DOCUMENTS

| | | | | |
|---|---|---|---|---|
| 2006/0294025 | A1* | 12/2006 | Mengerink | 705/77 |
| 2008/0114884 | A1* | 5/2008 | Hewes et al. | 709/229 |
| 2011/0091026 | A1* | 4/2011 | van Oortmarssen et al. | 379/142.01 |

FOREIGN PATENT DOCUMENTS

| | | |
|---|---|---|
| EP | 0986209 A2 | 3/2000 |
| GB | 02389693 A | 12/2003 |
| RU | 2301449 C2 | 6/2007 |
| RU | 2303811 C1 | 7/2007 |
| WO | 03/047208 A1 | 6/2003 |

OTHER PUBLICATIONS

Robinson, Carlos, "Hackers can infiltrate SMS banking passwords", Nov. 7, 2007, 4 pages (http://www.thedaily.com.au/news/2007/nov/07/banking-sms-passwords-vulnerable-hackers/).
Henderson, Colin, "Customers don't want authentication devices | Abbey", Mar. 25, 2008, 3 pages (http://thebankwatch.com/2008/03/25/customers-dont-want-authentication-devices-abbey/).
"GSM", from Wikipedia, the free encyclopedia, 9 pages, (http://en.wikipedia.org/wiki/GSM).
"History of mobile phones", from Wikipedia, the free encyclopedia, 11 pages (http://en.wikipedia.org/wiki/History_of_mobile_phones).
"Computer network", from Wikipedia, the free encyclopedia, 17 pages (http://en.wikipedia.org/wiki/Computer_network).
"Internet", from Wikipedia, the free encyclopedia, 19 pages (http://en.wikipedia.org/wiki/Internet).
"Base station", from Wikipedia, the free encyclopedia, 7 pages (http://en.wikipedia.org/wiki/Base_station).
"Sim card", from Wikipedia, the free encyclopedia, 11 pages (http://en.wikipedia.org/wiki/Sim_card) (redirects to http://en.wikipedia.org/wiki/Subscriber_Identity_Module).
"Subscriber identity module", from Wikipedia, the free encyclopedia, 11 pages (http://en.wikipedia.org/wiki/Subscriber_Identity_Module#Authentication_Process).

* cited by examiner

*Primary Examiner* — Lisa Lewis
(74) *Attorney, Agent, or Firm* — Patentbar International, P.C.

(57) ABSTRACT

This invention relates to processes of personal user authentication in computer and mobile wireless communications networks to perform transactions including payments. The process provides remote user authentication in various computer networks, the Internet inclusive, to perform secure transactions such as e-commerce and remote banking (on-line banking, remote banking, direct banking, home banking, internet banking, PC banking, phone banking, mobile-banking, WAP-banking, SMS-banking, GSM-banking, TV banking).

6 Claims, 1 Drawing Sheet

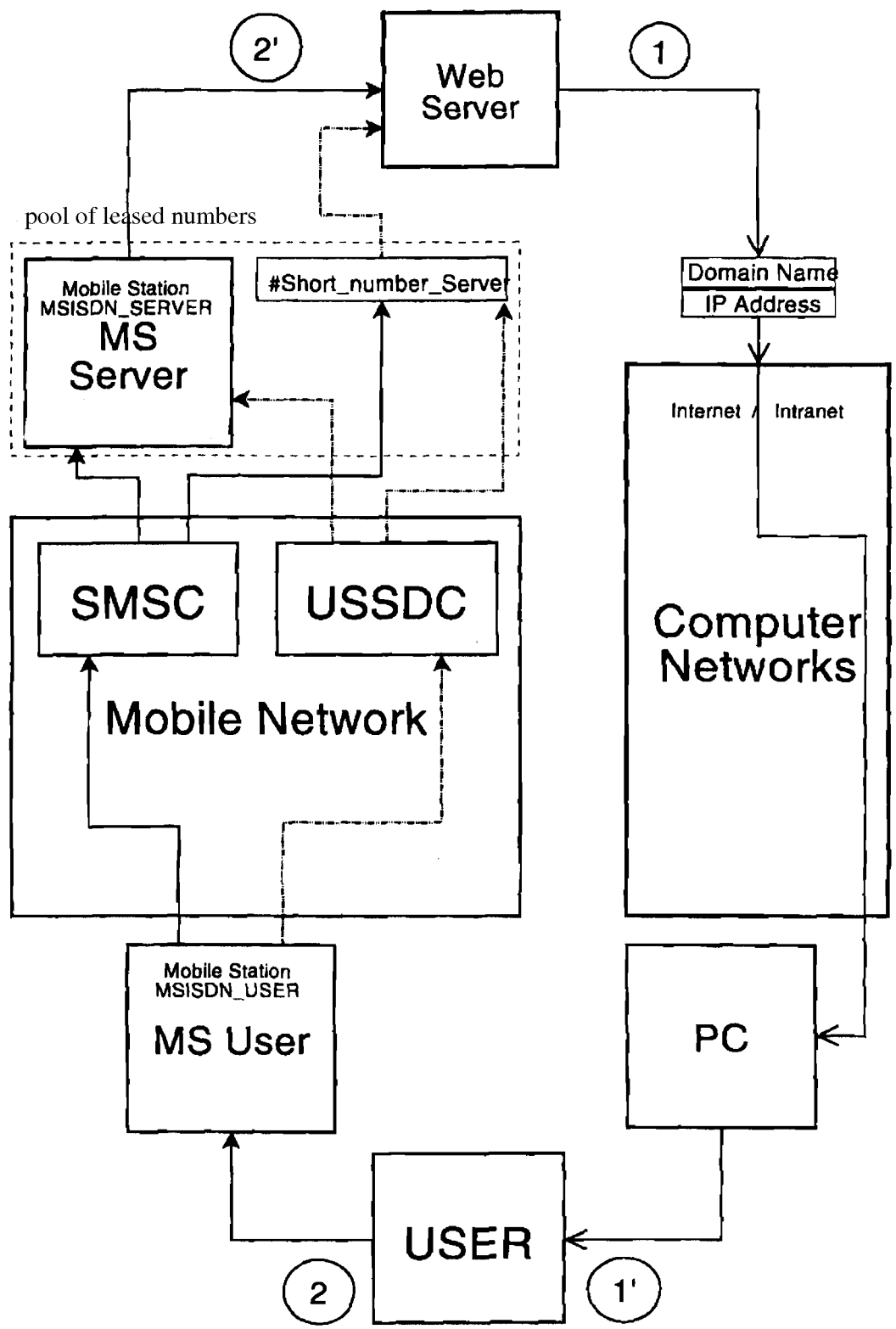

PROCESS OF REMOTE USER AUTHENTICATION IN COMPUTER NETWORKS TO PERFORM THE CELLPHONE-ASSISTED SECURE TRANSACTIONS

FIELD OF THE INVENTION

This invention relates to processes of personal user authentication in computer and mobile wireless communications networks to perform transactions including payments. The process provides remote user authentication in various computer networks, the Internet inclusive, to perform secure transactions such as e-commerce and remote banking (on-line banking, remote banking, direct banking, home banking, internet banking, PC banking, phone banking, mobile-banking, WAP-banking, SMS-banking, GSM-banking, TV banking).

BACKGROUND OF THE INVENTION

Rapid development of information technologies, the internet and wireless mobile communication networks resulted in a huge increase in cybercrime. According to one estimate, in 2004 cybercrime revenues were US$105 billion—more than the drug business. Cybercrime includes, inter alia, unauthorized access and eavesdropping, alteration of digital data, illegal copying, computer sabotage and computer fraud.

The growth in the number of network information and financial services against the background of significant increases in the number of cyber crimes (doubling each year, on average) makes the task of reliable remote user authentication in computer networks, including the internet, extremely important. It is thought that one in every five internet transactions remains vulnerable to fraud. Even a single-use SMS password sent to a customer's mobile phone does not guarantee desired outcome since customers rarely pay attention to the changes in their account pointed out in such text messages.

It is worth it to separately examine a category of cybercrime known as digital property theft. By using viruses, special spyware and false web pages hackers steal users' personal data (user names and passwords). This may enable hackers, for example, to gain access to and take full control over an email account at a free public email service such as Gmail email service, Yahoo! email service or Mail.ru email service, or an account at a social-networking website such as Facebook social-networking website, MySpace social-networking website or Classmates.com social-networking website. Having taken control over the account, hackers may read the user's personal correspondence, including with financial institutions, and send messages on his behalf that cause substantial harm or financial damage to the user. Thus the means of reliable, accurate and unambiguous user authentication are becoming more and more important.

Initially, software authentication implemented through a login procedure—when user specifies his user name and password—became widespread. Experience then showed that software authentication cannot provide the necessary level of data security and that special hardware-based authentication means in the form of electronic keys and biometric sensors are required. Remote authentication methods that do not require hardware keys and rely on passive authentication based on gathering and analyzing electronic user identification data were also developed. One example of such authentication is described in Patent RU No 2303811 C1, IPC G 06 F 21/22, application No 2005134419/09, published 7 Nov. 2005). Data security experts think that such authentication should augment hardware key-based authentication since it offers the highest level of security.

Due to this, the so-called security tokens and smart cards (hardware tokens, authentication tokens or cryptographic tokens)—specialized hardware keys provided by an organization to authorized users—gained widespread use. These hardware keys have special architecture (specialized microchips with protected memory, special microcontrollers, a unique ID number, hardware random number generator etc.) and are used to generate cryptographic keys and one-time passwords, to perform authentication when accessing corporate networks remotely, for cryptography of data streams and digital signatures for documents. One shortcoming of hardware keys is that one such key cannot be used in multiple corporate networks, since that will lead to increased threat of intrusion. Given that the internet offers a multitude of different services, it is evident that one user will require several hardware tokens for secure connection to different networks. Considerable cost of security tokens is also not conducive to their widespread use.

Another widely used way to establish secure connections is the so-called VPN or a virtual private network—a logical network superimposed on another network, like the internet or an intranet. Despite the fact that in this case the data traffic is carried by public networks using non-secure protocols, the use of encryption provides a way to exchange information that is closed to outsiders. A VPN makes it possible to link several offices of an organization into one network using public communication channels.

When connecting a remote user (or when establishing connection with another secure network), the access server requires the user to go through the process of identification and then authentication. Upon successful completion of both processes the remote user (or network) is granted access privileges, i.e. become an authorized user. A VPN can also be either software or hardware/software based. The use of special hardware increases the level of information security.

Another known way of remote user authentication is described in Patent EP No 0986209, IPC H 04 1 9/32, published 15 Mar. 2000. The essence of the method is as follows: electronic user identification data is stored in the authentication server's database and is then compared with identification data furnished by the user when attempting to access a secure system. This comparison is the basis for the decision whether a particular user has the required access privileges. Electronic user identification information in this method may include user biometric data such as fingerprints, palm prints, and/or iris scans that are saved in the authentication server's database. The authentication server usually also verifies such identification data as username and password. The main shortcoming of this method of remote user and system authentication is that authentication is active and thus involves exchanging substantial amounts of data (fingerprint, palm print, iris scans). This increases the vulnerability of the authentication server because an intruder may introduce false data, including computer viruses, into the data exchanged between the user and the server. Another shortcoming of the method and of the systems used to execute it is lower data transfer speeds from the user's access terminal to the authentication server due to larger data volumes (user's fingerprint, palm print, iris data). Yet another shortcoming is the need to use costly specialized equipment such as hardware to capture user biometric data like finger and palm prints and/or iris scans, etc.

There is also the "A Method of Strong Multifactor Authentication Method Of Payment Card Holders That Involves The Use Of A Mobile Phone And A Mobile Wireless Telecommunication Environment To Effect Interbank Financial Transactions In An International Payment System Using The 3-D SECURE Protocol Specification (Versions) And The System To Implement It" (Patent RU No 2301449, IPC G 06 Q 20/00, application No 2005118828/09, published 27 Dec. 2006). The invention is a means of personal identification of customers during transactions performed over mobile communication networks. Among the invention's applications is its use to perform authentication when making a payment by charge card using a mobile phone. The technical result of using this method is a financial transaction with guaranteed transaction confidentiality. When carrying out interbank financial transactions in an international payment system using the 3-D Secure protocol specification as part of a multifactor strong customer identification process involving the use of a mobile phone over a mobile communication network, four transaction steps are performed sequentially: transaction initiation; generation and delivery of authentication request; generation and delivery of a response to the authentication request; transaction execution, generation and delivery of notification on the transaction results. During each step the signal-messages are transferred between the parties using 3-D Secure specification components.

Another known payment method is implemented using a system that contains a means of generating a unique identifier for the payment amount as a response to customer payment request; the means to transmit the amount ID to the customer's mobile phone; the means to store the ID at the central data server, the means to receive the ID sent from the customer's mobile phone (the ID contains information about the payment), the means to verify (match) at least a part of the ID with a least some of the ID's already generated; and the means for indication of the ID (Patent GB No 2389693, IPC 7 GO7F 19/00, Published 17 Dec. 2003). A shortcoming of this method is the need to transmit the ID over open communication channels without additional encryption.

Another method of performing transactions using a mobile phone (or another mobile device like a pocket PC) connected to WAP or GPRS service is described in application WO 03/047208 A1, IPC 7 H04L 29/06, published 5 Jun. 2003. The method involves the following phases: receiving information about a transaction using a mobile phone; transmitting information about the transaction to the processing server to check whether the transaction is possible; if the processing server returns a positive result and the transaction is possible this information is then sent to the mobile phone via the Internet. This version's disadvantage is that the data is sent openly over the internet.

A poll commissioned by Abbey, an English bank, among one hundred of its customers has shown that only one in three (32%) of them wants to use special devices that may provide additional security of internet transactions.

Thus, the efforts of commercial banks to make online transactions more secure are not received well by their customers who do not want to buy and use special hardware keys without which it impossible to substantially increase the security of internet transactions.

The overview provided above shows that it is not possible to significantly improve the security of internet transactions without using a hardware key, but those keys are not welcomed by users.

The closest analog (prototype) to the proposed invention is the "A Method of Strong Multifactor Authentication Method Of Payment Card Holders That Involves The Use Of A Mobile Phone And A Mobile Wireless Telecommunication Environment To Effect Interbank Financial Transactions In An International Payment System Using The 3-D SECURE Protocol Specification (Versions) And The System To Implement It" (Patent RU No 2301449, IPC G 06 Q 20/00, application No 2005118828/09, published 27 Dec. 2006).

BRIEF DESCRIPTION OF THE DRAWING

The drawing is a block diagram of the authentication method of the present invention.

DETAILED DESCRIPTION OF THE INVENTION

Versions of the method and the implementation system described in the Patent application provide to subscribers of mobile (cellular) networks a convenient and simple way of performing transactions with guaranteed confidentiality. The required level of confidentiality of the data transferred is achieved by not transmitting secret information about the credit card, namely the PAN code, card expiration date etc. Transactions can be performed over the existing mobile (cellular) communication networks and do not require the carrier to use additional equipment. To ensure authenticity and security of banking transactions, reliable means of authentications are applied as an integral part of the overall security policy. Compared with traditional passwords, the strong multifactor authentication in open mobile (cellular) GSM telecommunication networks ensures a substantially stronger and more reliable data security while being easy to use and enabling to identify a person who is a counterparty to an electronic transaction using an open telecommunication network.

The main disadvantages of this method, taken as a prototype, are as follows:
  It is impossible to use a known way for user authentication to perform non-financial transactions in computer networks;
  A narrow field of application;
  It is possible to intercept the personal data being transmitted since the customer (cardholder) sends the details of the payment card and his own authentication data to the issuing bank over a protocol protected from unauthorized access, but the fact that the card and customer data are transmitted, even over a secure communication channel, potentially makes them vulnerable for interception and unauthorized use;
  It is necessary to use a specialized software applet stored on the SIM-card of the customer's mobile phone; in practice the use of such an applet may require replacement of the customer's standard SIM-card with a special new one, which results in additional administration complexities before this method can be used.

The proposed engineering solution consists in development of process providing remote users' authentication in various computer networks to perform cellphone-assisted secure transactions.

This task is implemented through commonly used hardware keys, namely, SIM-cards of cellphones, to identify users. For example, the SIM-cards and R-UIM cards are used in GSM networks and UMTS networks, respectively.

This process of user authentication in various computer networks, the Internet inclusive, to confirm transactions is implemented through using cellphones connected to a network of mobile cellular communications Operator (MCCO) providing and leasing short code services. The proposed process differs from the known methods in that the web-server Administrator pre-books in its name or takes in lease from the MCCO Operator at least one cellphone number of MSISDN (Mobile Station Integrated Service Data Network) Server or at least one short code of Short_Number_Server, wherein said user, at registering on the web-server, reports at least one MSISDN_User personal cellphone number added with user login and password.

The said web server, at the said user authentication, sends via said computer network to the said user a code message that the said user returns then to the web-server through his/her MSISDN_User number to the web-server's MSISDN_Server number or through the MSISDN_User number to the Short_Number_Server short code.

Other features of the proposed process include:
- In GSM standard networks the user applies the MCCO Operator's SMS and/or
- MCCO Operator's USSD services to sending code message;
- The server updates (modifies) the code message for every transaction;
- Before sending-back the code message, the user modifies the received code message using, for example, hardware/software means, encryption tables or individual password, provided well in advance by the website's Administrator, over anti-surveillance data delivery channel;
- The web server sends in real time messages notifying said user on the first drawdown of user account and/or on any attempt to modify the user's password, to the registered user's MSISDN cellphone number, e-mail or Instant Messenger;

The proposed process implementation resulted in development of a simple, highly reliable and flexible process of multimodal remote user authentication in various computer networks, the Internet inclusive, using hardware keys. The use of a SIM-card as a hardware key enables to expedite the implementation of the proposed process and to substantially reduce the associated promotion costs while also minimizing the upfront user expenditure to practically zero.

The implementation of the proposed process is illustrated in the attached chart, indicating as follows: a network of mobile cellular communications Operator (MCCO), user facilities (a personal computer and cellphone), computer networks, web-server whose administration takes lease at least one MCCO Operator's MSISDN Server cellphone number or at least one MCCO Operator's Short_Number_Server shortcode, Let us consider the implementation of the proposed process using the GSM standard as an example. According to the GSMA Association, the GSM standard has a market share of 82 percent, with 29 percent of the world's population using GSM global technologies (roaming) The total number of GSM subscribers exceeds 2 billion people in 212 countries.

The GSM system has many security features that were developed in order to provide to the subscriber and the MCCO Operator a higher level of security from fraudulent practices. Authentication mechanisms guarantee that only subscribers acting in good faith and possessing legal (i.e., not stolen or non-standard) equipment have access to the network. Since the connection is established, information over the network is transmitted in encrypted form to avoid eavesdropping. Confidentiality for each subscriber is secured by protecting his identity and location.

GSM is a second-generation (2G) network, although as of 2006 it is conditionally in 2.5G phase (with 1G being an analog cellular network, 2G—digital cellular network, 3G—broadband digital cellular communication systems switched by multimodal computer networks, the Internet inclusive.

A GSM system consists of three main subsystems:
BSS—Base station subsystem;
NSS—Network Switching Subsystem;
OMC—Operation and Maintenance Centre.

A separate class of GSM equipment is terminal devices, i.e., Mobile Station (MS), commonly referred to as a mobile phone (cellphone). Each cellphone is equipped with a SIM card to work in a MCCO Operator's network.

A SIM card or Subscriber Identity Module is a removable smart card that stores unique information about a subscriber as well as the phone book. The SIM-card confirms subscriber's authenticity to the network and stores all necessary data related to specific subscriber powers. A PIN code is provided to prevent the card from unauthorized use in the event it is stolen. Also, the advantage of SIM-card application consists in eliminated need to change cellphone number when changing cellphone; so, it is only necessary to insert the SIM-card itself in another cellphone. All the data stored on the card, including the phone address book, is then accessible on another cellphone.

Each MCCO Operator's SIM card stores the International Mobile Subscriber Identity (IMSI), a unique international subscriber identifier associated with each GSM or UMTS mobile communications user. At logging-in to a mobile communication network the subscriber's cellphone transmits to the MCCO Operator the IMSI code identifying said subscriber.

In the GSM network switching subsystem (NSS) there is an Authentication Center (AUC) that authenticates a subscriber, or more precisely, the subscriber's SIM card (Subscriber Identity Module). Network access is authorized only upon successful SIM card authentication, during which the AUC sends to the Mobile Station (MS) a public key, then the AUC and the MS in synchronism encrypt unique authentication key of said SIM card using a unique algorithm. Then the MS and the AUC return to the MSC (Mobile Switching Center) the Signed Responses (SRES) that are the results of this encryption. The MSC tests the responses for their matching and, if so, the authentication is considered successful.

The MSISDN number (Mobile Station Integrated Services Digital Network), i.e., a subscriber cellphone number associated with the SIM card and used to make and receive phone calls uniquely corresponds to each IMSI number (SIM-card). The primary MSISDN number is used for voice calls and SMS messages. In fact the MSISDN number is a public (commonly known) phone number of a specific subscriber.

The data stored on the SIM card are well protected with PIN codes and PUK passwords and with a special encryption algorithm. The Personal Identification Number (PIN code) is provided to protect a stolen SIM card from fraudulent use. A PIN code in a SIM card is four-of-eight bit decimal digits. Users have an option of turning off this level of security. A SIM card is also capable to storing PIN2, a second four-of-eight bit decimal code to protect certain features accessible to subscriber.

As soon as the PIN code (and the PIN2, if required) is properly entered, the maintenance entity will have access to the data stored on the SIM card. The technical requirements also address the procedures to be implemented when an invalid PIN code is entered. After three consecutive attempts to enter an invalid PIN code the SIM card is locked and further attempts to enter the PIN code are ignored even if the SIM card is removed from the maintenance entity. Such a SIM card may be unlocked by entering an eight-bit decimal code known as PUK code, which is also stored on the SIM card. The SIM card is locked irrevocably after 10 unsuccessful attempts to enter the PUK code.

So, in order to sign on to a GSM network a user has to provide the MCCO Operator with documents of identity (ID); sign a contract; and receive from the MCCO Operator an original SIM card with PIN and PUK codes as well as with passwords to it.

It is impossible even today to forge a SIM card without having physical access to it. These properties enable to consider a SIM card as an original and highly secured hardware key with closed architecture oriented towards use in specialized GSM wireless networks. Access to GSM MCCO Operator networks is physically impossible without an original SIM card issued by the MCCO Operator. So, the numbering address space of all GSM and UMTS cellular MCCO Operators may be considered as an analog to a secure VPN network built using hardware/software means (through using SIM cards), where each address (a MSISDN cellphone number) is strictly personalized in individual or group (corporate) contract signed with a specific mobile MCCO Operator.

One of basic services in the GSM standard is SMS services, i.e., Short Message Services. Any SMS message may not be sent anonymously, due to its implementation through using a specific SIM card obtained from a specific mobile MCCO Operator and having a unique IMSI number uniquely corresponding to a single MSISDN number, i.e., a public cellphone number. It is impossible to send a deceptive SMS message from another cellphone without an authentic SIM card. Unauthorized entering into a MCCO Operator's numbering address space is possible only through using stolen authentic SIM card. USSD service, being also standard for GSM, is similar to SMS, with the difference that the USSD service does not support storage of messages, so that, the message traffic is performed in real time within a single USSD session. But as before a SIM card is required to operating.

So, if a web server's user specifies his MSISDN User number (public cellphone number) in the registration application, then a code message sent by the user from a registered MSISDN User number via an SMS-server or USSD-server in process of authentication may be considered as a certificate confirming that the message was sent by a properly authorized user through using an authentic SIM card.

So, to identifying user the web server sends him a code message (see steps 1 and 1' in the attached chart) to be returned by said user to the web server from his MSISDN User number to the MSISDN Server number or from MSISDN User number to the number of Short Number Server using his cellphone (see steps 2 and 2' in the attached chart).

The described process proposes to use the above mentioned features of the GSM standard, SMS and USSD standard services, as well as SIM cards to remotely identify users in computer networks, the Internet inclusive.

The proposed process ensures multimodal authentication, since authentication is considered valid and the transaction confirmed if:

User account name (login) matches the account name registered at given web server;

Entered password matches the password registered for said user;

User entered the correct PIN code to activate the cellphone SIM card;

At given instant of authentication process the user sends from his registered MSISDN User's cellphone number a correct code message through the MCCO Operator's SMS or USSD message center to the MSISDN Server number or Short Number Server number, leased by the web server administrator from the MCCO Operator;

Code message received by the web server from the user is updated in accordance with the personal password and additional means of encryption (software/hardware means and encryption tables) of said web server.

The proposed process has a very highly secure architecture since the systems used in operation and authentication (computer networks, MCCO Operator networks and the cellphone used in user's authentication) are isolated from one another.

There is the so-called "air gap" that does not allow intruders to intercept or control user operations from one environment into another. The available "air gap" prevent the hackers to establish remote control over a user's cellphone (computer viruses cannot spread over the air), which makes the proposed process significantly more reliable and increases user trust.

The proposed process creates significant difficulties for hackers, since it is impossible to remain anonymous in a MCCO Operator's numbering address space, i.e., all messages are to be sent from a specific cellphone number and today all mobile MCCO Operators register their users' identity passport details. Anonymity, the main principle of hacking, is so violated. Any attempt to "break-in" a bank's or other network's security resources by guessing the password by search method will inevitably lead the security department to the owner of registered cellphone number. The use of stolen cellphones for hacker attacks is not effective, since, as a rule, the legal owners of cellphone numbers block the stolen SIM card immediately and get a new card from their MCCO Operator ("old" SIM card becomes invalid).

Also, a stolen number may be used to attempt to breaking-in only a specific personal bank account/user account. It is impossible to guess the password by search method from another cellphone number, since it is not associated with the target record. To break-in a system, hackers need of original SIM card inserted in the specific user's cellphone. On the first try it is impossible to guess the password correctly, and the information system meantime notifies the user and the security department about any attempt to use invalid passwords or incorrect keys. It is not practical to steal a cellphone for every three to five password-guessing attempts. Also, the MCCO Operator maintains special logs that enable to determine the cellphone location, when it attempts to establish connection with the MCCO Operator's network. This may substantially assist the law enforcement community in preventing fraud practices.

The web server may additionally notify the user on starting use of the said user's account by SMS messages sent to a registered MSISDN User number in e-mail letters format or through services of instant messages (such as ICQ, Skype, QIP etc). This enables user to promptly respond to hacker attacks and block his account preventing any unauthorized applications. For example, sending a text message with the text "STOP" to a MSISDN Server number or Server Short Number, he prohibits to using his account for the next 24 hours.

This process allows using a single universal hardware key, a cellphone user's SIM card, instead of several different keys, since a user may operate with different accounts and passwords to access different web servers and network resources. The principles of the process's implementation for the GSM format outlined above may be also applied to the CDMA and UMTS networks.

Implementation of proposed process enables the users to regain control over their lost "digital property" even in stolen cellphone situation. Let us suppose, for example, that those hackers learned and stole user's account data, including his password for a given web server, and even they stole user's cellphone itself. Further, let us suppose that they also stole details of specialized encryption process and rules of their application (including cryptographs, code tables, an optional individual password etc.). Having gained access to everything they need, hackers enter a new password, contact email address and, seemingly, gained full control over the said user's account.

Having learned that his cellphone is stolen, the user, in accordance with the contract and instructions, contacts his MCCO Operator's subscriber station and blocks his number from unauthorized use. Then, he contacts his mobile MCCO Operator in person, provides documents of identity and gets a new authentic SIM card, which is registered by the MCCO Operator into a previously allocated MSISDN User cellphone number. Using his account (login) and completing password recovery procedure, applying his new SIM card and MSISDN User's cellphone number allocated by the web server at the time of registration, the user easily regains control over the stolen digital property.

The majority of users already possess skills and knowledge needed to using proposed process, especially, they know to use a cellphone, to send SMS and USSD messages through the MCCO Operator's message center, as well as Internet operations. If so, it is possible to implement the process quickly and with minimal investment.

Example 1

User Registration on a Website

Subscriber enters the given website's URL address.
For example, www.secure_mail_portal.com
Then, the said subscriber select the option "Registration on this website", gets a webpage with the application form and enters the following information:
"Enter your login: John Smith
Password: side^cookie_91
e-mail: John_Smit_Inc@gmail.com
Personal cellphone number: +7.701.111-11-11
Having received the user's personal details the website returns the following message to the user: "You were registered as: John Smith, e-mail—John_Smit_Inc@gmail.com
Password: **************;
To confirm your registration please send the following code message: AKDJ__1928_WKDS__0101_xLdU to the following number: +905326129292;"
Then the user sends the message (AKDJ__1928_WKDS__0101_xLdU) from his registered cellphone number (+7.701.111-11-11) to the web server number (+905326129292).
Having received the message from the user, the web server test s the sender's cellphone number and if it matches +7.701.111-11-11, the web server sends the following message to the user: "Registration completed. Your account is registered. User instructions were sent to your email box" and completes the registration procedure.

Example 2

Confirmation of Payment Transaction

User enters his bank's URL in web browser's address bar,
For example www.secure_banking_global.com,
Then, he selects the option "Enter payment instructions" and enters the instructions.
The web server, having received the instructions from the user, begins the user authentication procedure and sends a code message (1) to the user over the computer network: "You have entered the following payment orders:"
<The text and details of the payment orders follow>
To confirm these payments please send code message "132-298-192-FBI" to number +7.777.777-77-77.
Then, the user sends the code message (132-298-192-FBI) received over computer network using his personal cellphone number (+7.701.111-11-11) to the web server's cellphone number (+7.777.777-77-77).
The web server receives the said code message and tests it for its authenticity and checks the sender's cellphone number.
If the sender's cellphone number matches the number registered in the name of the user John Smith (+7.701.111-11-11), then the web server sends the following message to said user over computer network:
"Your confirmation was received. Payment orders are accepted for processing".

Example 3

Changes in User's Personal Details on the Web Server

User enters the web server's Domain Name:
"www.secure_mail_portal.com"
Then, he selects the option "Change email address and password".
The web server sends the following message to the User:
"You would like to change your account details. Please send the code 023+10110392 to short number #1234."
Then, the User dials the following into his cellphone:
*1234#023+10110392#-<Enter>
Through using the MCCO Operator's USSD server the code message is delivered to the short number #1234 registered onto the www.secure_mail_portal.com web server.
If the code message received matches the sent one and the sender's cellphone number matches +7.701.111-11-11, the web server proceeds with the procedure to changing all account details, with exception of user's personal cellphone number.
If sender's cellphone number does not match the one in the account details, the web server sends the following SMS message to the registered user's cellphone number +7.701.111-11-11:
"There was an attempt to change your account details from the following IP address: *-*-*-*".

Example 4

Regaining Control over Stolen "Digital Property"

Let's us to suppose that the criminals stole a user's cellphone and used it to alter the user's account data. In accordance with the website's policy they managed to change all account details, with exception of login and cellphone number, through inserting new password and email.
Having discovered that his cellphone is stolen, the user notifies his MCCO Operator and blocks the stolen SIM card. Having then visited the MCCO Operator's offices and provided them with documents of identity, the user gets a new SIM card and activates it using his "old" cellphone number.
The user enters the website's URL address, for example:
www.secure_mail_portal.com
and selects "Recover lost password".

The web server activates the authentication procedure, sends a code message "KDIS-2dkU-UdPd-2093" to the user and asks the user to forward it to +7.777.777-77-77:

The user, using a special personal password received when signing the contract with the MCCO Operator, sends the updated message "KDIS-2dkU-UdPd-2093+9873" at web site number +7.777.777-77-77.

The web server tests content of the updated code message and checks the sender's number.

If they match the account details and the special personal password, the web server asks the user to continue editing his account details.

The user enters the updated password and email address and confirms the changes with his cellphone. So, the user succeeded in regaining control over his lost "digital property".

The invention claimed is:

1. A method for user authentication in a computer network or Internet to confirm transactions using a mobile phone connected to a mobile Network Operator (MNO) network providing and renting out short code services, the method comprising:
    an Administrator of a web server registering or leasing in its name at least one MNO's MSISDN Server mobile phone number or at least one MNO's Short Number Server short code,
    said user registering with the web server at least one MSISDN User personal mobile phone number, a user login, and a password,
    said web server, for said user authentication, sending via said computer network or Internet to said user a code message,
    said user subsequently sending the code message to the web server by a user's mobile phone from the MSISDN User personal mobile phone number via the MSISDN Server mobile phone number or from the MSISDN User personal mobile phone number to the Short Number Server short code.

2. The method of claim 1, further comprising using a smart (SIM) card provided by the MNO to said user and inserted into the user's mobile phone as a hardware key for said user authentication.

3. The method of claim 1, wherein the user uses the MNO's SMS services and/or the MNO's USSD services for the sending of the code message.

4. The method of claim 1, further comprising the web server updating the code message for each transaction.

5. The method of claim 1, further comprising before sending the code message the user modifying the code message using hardware, software, encryption tables, or an individual password provided by the Administrator over a secure data transmission channel.

6. The method of claim 1, further comprising the web server sending in real time messages notifying said user on a user account being accessed and/or on any attempt to modify the user's password to the registered user's MSISDN User personal mobile phone number, via e-mail, or via Instant Messenger.

* * * * *